Patented July 24, 1928.

1,678,022

UNITED STATES PATENT OFFICE.

OMAR H. SMITH, OF NEW YORK, N. Y., ASSIGNOR TO GENERAL RUBBER COMPANY, OF NEW YORK, N. Y., A CORPORATION OF NEW JERSEY.

PROCESS FOR TREATING RUBBER LATEX AND PRODUCTS OBTAINED THEREBY.

No Drawing. Application filed June 25, 1925. Serial No. 39,626.

This invention relates to methods of controlling the viscosity of aqueous dispersions of rubber, and to the products obtained thereby.

Various means have been devised for increasing the viscosity of rubber latex. It has been proposed to alter the viscosity of rubber latex by the addition of hydrophilic colloids and/or certain compounding ingredients. Other methods set forth the use of latex coagulants or agglutinants. In the former category, the latex is not coagulated, but remains as a relatively stable paste or cream. The employment of coagulating agents, however, results in an actual separation of rubber from serum, the rubber being no longer dispersible in water.

The present invention has as its principal object a method of separating water soluble non-rubber constituents from the rubber particles in latex and recovering a water-dispersible rubber freed of the greater portion of such non-rubber materials. The invention also contemplates controlling the thickness of rubber dispersions, compounded or uncompounded. Another object of the invention is to provide a method for controlling the state of aggregation of the rubber particles in latex or other dispersions of rubber. A further object is to control the hydrogen ion concentration of rubber dispersions. Another object of the invention is to redisperse thickened rubber dispersions to their original viscosity.

With a preferred embodiment in mind, but not desiring to place undue limitations upon the scope of the invention, beyond what may be required by the prior art, the invention briefly comprises adding a properly constituted thickening agent to latex to cause a separation of the uncoagulated rubber-containing portion from the serum, redispersing and reseparating the rubber containing portion, and repeating the redispersion and reseparation, to yield an uncoagulated rubber dispersion freed of substantially all the water-soluble non-rubber constituents which were originally present. The invention also includes the addition of a buffer solution of predetermined hydrogen ion concentration to a rubber dispersion which may or may not contain compounding and/or vulcanizing ingredients, to impart a desired viscosity. By buffer solution is meant a solution to which a material amount of acid or base can be added without effecting any considerable change in hydrogen ion concentration.

As a specific example of the method of separating the uncoagulated rubber portion from the serum containing part of the non-rubber constituents, the following may be used: Ordinary ammonia-preserved latex is freed from the ammonia by any suitable means, and a small amount of a preservative such as phenol (0.3%) is added. To 100 parts of this latex, 10 parts of a 10% solution of a mixture of 3 parts of hydrated primary sodium phosphate and 1 part of hydrated secondary sodium phosphate are added, and 400 parts of water. The mixture is stirred vigorously and allowed to stand. After some time, perhaps as much as several days, the rubber containing portion rises to the surface and leaves a clear serum beneath. The clear serum, containing no rubber, but a large portion of the water soluble non-rubber constituents, may be drained off or siphoned away from the thickened supernatant layer of uncoagulated rubber. The thickened layer may be redispersed in a fresh quantity of water and the process of thickening, draining and redispersing repeated as often as it is desired. A single washing, such as that described above, may remove as much as 80% of the water-soluble constituents originally present in the latex. If 2 parts of concentrated ammonium hydroxide or 3 parts of trisodium phosphate be added to the thickened layer, the latter may upon agitation, be restored to its original viscosity. The trisodium phosphate may be added as a solid, but such addition requires more careful stirring than when the phosphate is added in solution.

While in the above example a mixture of hydrated primary and secondary sodium phosphate has been given as the thickening agent or buffer solution, the invention is not limited to the use of these materials. Other agents may be used if and provided their solutions possess the proper hydrogen ion concentration, or if they cause the rubber containing portion to separate from the serum without coagulation of the former.

The primary sodium phosphate used in the above example has a hydrogen ion concentration of approximately $1 \times 10^{-4}$, in a 10% aqueous solution, and the secondary phosphate has a hydrogen ion concentration of less than $1\times10^{-9}$ in a 10% aqueous solution. Mixtures of these two substances whose hydrogen ion concentrations lie within the range of $5\times10^{-8}$ to $1\times10^{-4}$, furnish an inexpensive and effective thickening agent for latex or for rubber dispersions.

The separation of the rubber into an upper layer in the above example is apparently due to aggregation of the rubber globules. Hevea latex which has been preserved with ammonia and subsequently freed from the ammonia thickens almost immediately when its hydrogen ion concentration is increased beyond $5\times10^{-8}$, and the degree of thickening increases as the hydrogen ion concentration is increased, until the latter reaches approximately $1\times10^{-4}$. At this point coagulation occurs. These hydrogen ion concentrations will of course vary somewhat with different latices and in the same latex may vary depending upon the age of the latex, its concentration and upon the prior treatment which the latex may have undergone. The hydrogen ion concentration of fresh Hevea latex may be somewhat higher than $5\times10^{-8}$. The thickening is apparently due to an aggregation of the rubber globules in the latex when the hydrogen ion concentration is increased beyond $5\times10^{-8}$. The globules may aggregate themselves into chains or clusters containing as many as 100 separate globules when the hydrogen ion concentration is greater than $1\times10^{-8}$. The Brownian movement in the globules decreases directly as the size of the aggregates increases up to a point where practically no Brownian movement can be detected when there are as many as 100 globules in one aggregate.

Certain rubber compounding ingredients have a similar property of causing a thickening and separation. These compounding ingredients may be classed as the chemically active compounding ingredients. In the majority of cases the thickening action of these compounding ingredients is due to their influence upon the hydrogen ion concentration of the latex.

If such agglomerated latex or thickened latex be treated with a base to reduce the hydrogen ion concentration, the aggregates are gradually dispersed and the fluid, when it reaches hydrogen ion concentration below $1\times10^{-8}$ cannot be distinguished from normal latex. Within the limits of approximately $1\times10^{-4}$, and $5\times10^{-8}$ the thickness of latex is directly proportional to its hydrogen ion concentration.

In order to obtain latex of a desired thickness, a properly constituted buffer solution is added in excess to the latex. The excess of buffer solution is not harmful, nor does the rubber coagulate if the solution be added rapidly. This is in contrast with thickening by the use of free acid. As a specific example of the different degrees of thickness or viscosity which may be obtained with rubber latex, the following may be given: A quantity of preserved latex which has been freed of ammonia having a hydrogen ion concentration lying between approximately $1\times10^{-8}$ and $1\times10^{-9}$ will show a viscosity of about 1.5 (Engler). By adding to every 100 cc. of the latex 10 cc. of a 10% solution of a mixture of 1 part of primary sodium phosphate and 3 parts of secondary sodium phosphate, the hydrogen ion concentration of the latex is increased to approximately $1\times10^{-7}$ and shows after such treatment a viscosity of 3.0 (Engler). Taking another quantity of untreated latex having a viscosity of 1.5 and adding to every 100 ccs. thereof 10 cc. of a 10% solution of a mixture of 2 parts of primary sodium phosphate and 1 part of secondary sodium phosphate causes sufficient thickening to give an Engler viscosity value of 46.5. Increasing the hydrogen ion concentration above $1\times10^{-6}$ yields a latex which is too thick to flow.

Rubber latex may also be thickened, due to excess basicity, when the hydrogen ion concentration is reduced below approximately $3\times10^{-14}$ by the addition of a strong base. If 3 to 5 parts of sodium hydroxide be added to 100 parts of latex, the latter will thicken in about 12 hours. The careful addition of an acid buffer solution in a quantity sufficient to increase the hydrogen ion concentration beyond $1\times10^{-13}$ causes the thickened latex to be thinned down to its original consistency. Other strong bases may be employed instead of sodium hydroxide.

Since the hydrogen ion concentration can be controlled in either direction as indicated above, it becomes apparent that the process of this invention can also be applied to the control of the thickness of viscosity of compounded rubber dispersions whether compounded artificial dispersions or compounded Hevea latex or other latex. The principle of control will be the same throughout, but the actual conditions will vary depending upon the nature of the compounding ingredients and/or protective agents employed and upon the effect of these ingredients upon the hydrogen ion concentration of the dispersion. For example certain types of vulcanized latex such as those containing zinc oxide, exhibit a tendency to thicken. This thickening may be further increased by the use of a proper buffer solution. Again it may be a comparatively simple matter to prepare a dispersion of an active filler in latex or in artificial latex, where the amount of said active filler is small. If it be desired to increase the viscosity of this compounded dispersion, it may be done by varying the hydrogen ion concentration to suit the requirements.

The thickened latex may be employed in any of the applications where latex, or latex compounds, or latex treated to increase its viscosity have hitherto been employed or may be employed. The invention provides a simple and inexpensive means for obtaining a thick latex which is especially suitable for dipping and coating. Compounding ingredients and/or vulcanizing materials may be incorporated with the latex provided they do not change the hydrogen ion concentration to such an extent as to render thickening and redispersion impossible. As an illustration of the beneficial effect of these changes in viscosity by the addition of proper buffer solutions or ingredients, the increased speed of deposit on a porous form may be cited. With increasing hydrogen ion concentration, there follows a corresponding increase in the thickness of rubber deposit obtained in the same time. A sample of rubber latex prepared according to the first example shows after treatment with buffer solutions to give varying hydrogen ion concentrations, a six-fold increase in the thickness of deposit on a porous form within the same length of time, as the hydrogen ion concentration of the latex was increased from PH 6.6 to 5.5. For practical purposes, a latex containing no other ingredient which might affect the dipping characteristics seems to deposit most efficiently between the limits PH 6.5 and 5.5, and 6.0 is the hydrogen ion concentration at which rapid deposition may be obtained without too great instability.

Having thus described my invention what I claim and desire to protect by Letters Patent is:

1. A process for treating rubber latex which consists in thickening the latex with a buffer solution, separating water-soluble substances therefrom and recovering a purified dispersible product.

2. A process for treating rubber latex which comprises thickening the latex with a buffer solution in the presence of an excess of water, removing water-soluble substances therefrom, and recovering a purified dispersible product.

3. A process for treating rubber latex which consists in thickening the latex with a buffer solution in the presence of an excess of water, removing water-soluble substances therefrom, treating the thickened portion with a material adapted to decrease the hydrogen ion concentration thereof, and redispersing the thickened portion of said latex.

4. A process for treating rubber latex which consists in thickening the latex with a buffer solution in the presence of an excess of water, removing water-soluble substances therefrom, treating the thickened portion with a base and agitating until redispersion of the thickened portion takes place.

5. A process for treating rubber latex which consists in thickening the latex with a buffer solution in the presence of an excess of water, removing water-soluble substances therefrom, treating the thickened portion with a base, and agitating until the thickened portion recovers its normal consistency.

6. A process for treating rubber latex which comprises adding a buffer solution adapted to vary the hydrogen ion concentration of the latex from approximately $5 \times 10^{-8}$ to not more than $1 \times 10^{-4}$.

7. A process for treating rubber latex which comprises adding an acid buffer solution adapted to vary the hydrogen ion concentration of the latex from approximately $5 \times 10^{-8}$ to not more than $1 \times 10^{-4}$.

8. A process for treating rubber latex which comprises adding a buffer solution containing sodium adapted to vary the hydrogen ion concentration of the latex from approximately $5 \times 10^{-8}$ to not more than $1 \times 10^{-4}$.

9. A process for treating rubber latex which comprises adding a buffer solution of sodium phosphates adapted to vary the hydrogen ion concentration of the latex from approximately $5 \times 10^{-8}$ to not more than $1 \times 10^{-4}$.

10. A process for treating rubber latex which comprises adding a buffer solution of primary and secondary sodium phosphates adapted to vary the hydrogen ion concentration of the latex from approximately $5 \times 10^{-8}$ to not more than $1 \times 10^{-4}$.

11. As a new product, latex treated with a buffer solution, and having a hydrogen ion concentration lying between $5 \times 10^{-8}$ and $1 \times 10^{-4}$.

12. As a new product, latex thickened with phosphates of alkali metals.

13. As a new product, latex thickened with a mixture of primary and secondary sodium phosphate.

14. As a new product, redispersible thickened latex having a hydrogen ion concentration lying between $5 \times 10^{-8}$ and $1 \times 10^{-4}$, said latex containing phosphates of alkali metals.

15. As a new product redispersible thickened latex containing a mixture of primary and secondary sodium phosphate, and having a hydrogen ion concentration lying between $5 \times 10^{-8}$ and $1 \times 10^{-4}$.

Signed at New York, county of New York, and State of New York, this 19th day of June, 1925.

OMAR H. SMITH.